US006222724B1

(12) United States Patent
Howell et al.

(10) Patent No.: US 6,222,724 B1
(45) Date of Patent: Apr. 24, 2001

(54) LCD HOUSING HAVING VERTICALLY OFFSET HINGES

(75) Inventors: Bryan Howell, Austin; Rick Wahl, Cedar Park, both of TX (US); Peter Skillman, San Carlos, CA (US); Otto Deruntz, Dunstable, MA (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,344

(22) Filed: Jan. 26, 1999

(51) Int. Cl.7 .................................................. G06F 1/16

(52) U.S. Cl. ........................................ 361/681; 248/919

(58) Field of Search ................................ 361/681, 682; 248/919

(56) References Cited

U.S. PATENT DOCUMENTS 4,918,632 * 4/1990 York .
5,245,559 9/1993 Lapeyre .
5,335,142 8/1994 Anderson .
5,494,447 * 2/1996 Zaidan .
5,510,806 * 4/1996 Busch ............................... 361/681 X
5,548,478 8/1996 Kumar et al. .
5,708,561 1/1998 Huilgol et al. .
5,768,096 * 6/1998 Williams et al. .................... 361/681
5,774,333 * 6/1998 Janik et al. .......................... 361/687
5,983,073 * 11/1999 Ditzik .
6,008,983 * 12/1999 Yen ..................................... 361/681
6,028,764 * 2/2000 Richardson et al. ................. 361/681

* cited by examiner

*Primary Examiner*—Jeffrey Donels
(74) *Attorney, Agent, or Firm*—Haynes and Boone, L.L.P.

(57) ABSTRACT

A portable computer includes a base and a cover pivotally connected to the base. The cover includes a substantially planar back plate and peripheral sides overhanging the base. An LCD panel is mounted in the cover and extends in a plane substantially parallel to the back plate. A hinge connection is mounted in an extended portion of one of the peripheral sides and substantially in the plane of the LCD panel. A hinge arm extends from the base and is extended to overhang a peripheral side of the base for pivotal attachment to the hinge connection in the extended portion of the cover.

10 Claims, 3 Drawing Sheets

3 26 28 36 66 34 68 28a 56 50 48 64 38 70 40 42 3

LCD HOUSING HAVING VERTICALLY OFFSET HINGES

BACKGROUND

The disclosures herein relate generally to portable computers and more particularly to an LCD panel cover of a portable notebook computer having offset hinges.

This application relates to co-pending U.S. patent application Ser. No. 09/002652, filed on Jan. 5, 1998, entitled LCD Housing Having Offset Hinges, naming Bryan F. Howell and Andrew W. Moore as inventors. The co-pending application is incorporated herein by reference in its entirety, and is assigned to the assignee of this invention.

The desire for large screen displays in portable computers is recognized in U.S. Pat. No. 5,245,559 which discloses a programmable portable electronic computer including a twelve key keyboard array capable of entering a full range of alphanumeric characters and computer commands and a large area electronic display screen. This affords room for graphical presentations with alphanumeric notation, and enough rows of printed text to afford word processing capabilities. Thus, a tape recorder within the housing may include software and is coupled for use in dictating, storage, word processing and computer interfacing, all under control of the keyboard keys.

There have been various attempts to address limitations associated with hinged couplings used in portable computers. U.S. Pat. No. 5,335,142 discloses a portable computer having a hinge assembly which allows the cover and display screen to be tilted from the base of the portable computer and then swivelled about a vertical axis. One hinge is provided at the rear edge of the base of the portable computer about which the cover both tilts and swivels. The hinge assembly includes stops which limit the amount of tilt and swivel. The cover of the personal computer may be tilted backwards from a closed position to 115° and swivelled 30° from a straight-forward position.

In U.S. Pat. No. 5,548,478, a laptop style computing device includes abase portion, a display portion containing a display screen and a touch input panel and a mechanism for selectively positioning the display portion in selective angular engagement with the base portion in a plurality of angular upright positions for use in the laptop mode, as well as the display up position for slate style use and the display down position for closing the device.

In U.S. Pat. No. 5,708,561, a portable computer includes a base and a cover incorporating a display screen pivotably mounted to the base between a closed position overlying the base and an open position raised over the base. A swivel arrangement is located in the cover enabling at least a portion of the cover and the display screen to be rotatable about an axis which is perpendicular to the cover in the open position, and between a landscape orientation in which the display screen has a longer dimension extending in a substantially horizontal direction, and a portrait orientation in which the display screen has a shorter dimension extending in a substantially horizontal direction. The cover is also mounted for sliding movement. Front speaker ports are opened and closed when the cover moves. A recessed corner segment is provided on the cover for easier manipulation of the cover.

The portable computer industry is providing notebook computers with larger and larger LCD displays to respond to user demand. New larger size LCD displays are being produced faster than the notebook chassis supply can respond. Typically an LCD panel is mounted in the cover of a notebook computer. The cover is mounted on a hinge or hinges for pivotable movement relative to the computer base. The hinge or clutch mechanism is mounted in the LCD panel cover directly below the LCD panel and within the same plane as the panel.

As a result, the placing of the hinges within the LCD panel cover, restricts the amount of space available for the LCD panel within the dimensions of the cover. Therefore, there is no space available in the LCD panel cover for expansion to accommodate a larger size LCD panel. One solution has been to provide a hinge which is offset from the plane of the LCD panel.

Therefore, what is needed is an LCD panel that is larger than the footprint of the portable computer base, and is mounted in a cover which is attached to the base.

SUMMARY

One embodiment, accordingly, provides an LCD panel cover of the present outside dimensions which can accommodate a larger LCD display panel than presently being used. To this end, a portable computer includes a base and a cover for housing an LCD panel. The cover includes peripheral sides overhanging the base. One of the peripheral sides of the cover includes an extended portion including a hinge connection. A hinge arm extends from the base. The hinge arm is extended to overhang a peripheral side of the base for pivotal attachment to the hinge connection in the extended portion of the cover.

A principal advantage of this embodiment is that in a portable computer, one cover size can be used for an LCD panel cover to host various size LCD panels including an LCD panel having a footprint which is at least as large as the footprint of the base of the portable computer.

DETAILED DESCRIPTION

Figure 1:
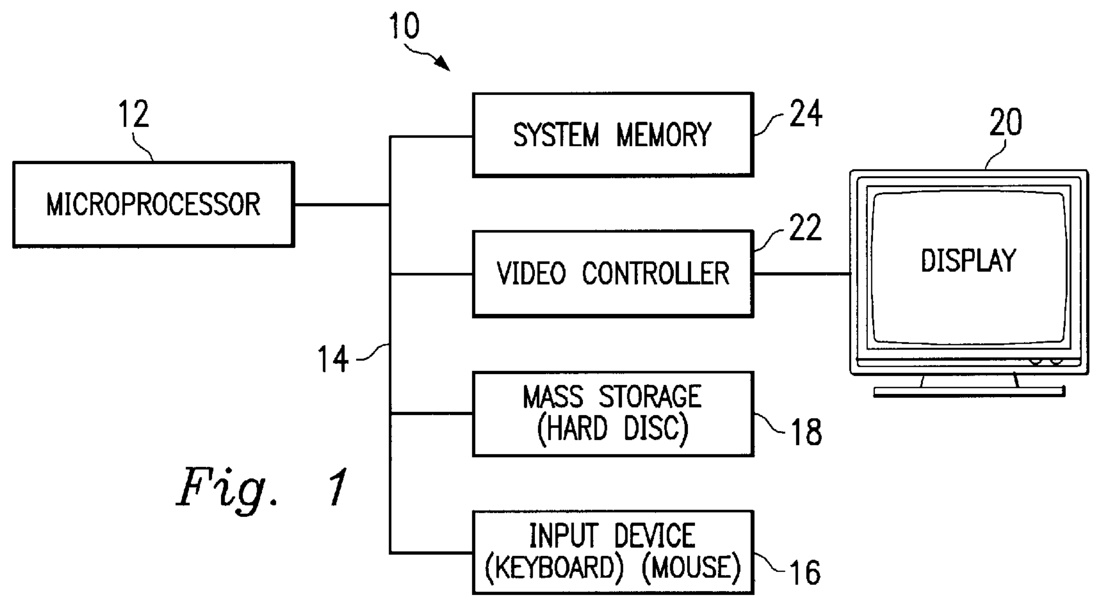
FIG. 1 is a diagrammatic view illustrating an embodiment of a computer system.

In one embodiment, computer system 10, FIG. 1, includes a microprocessor 12, which is connected to a bus 14. Bus 14 servers as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with a fast storage to facilitate execution of computer programs by microprocessor 12. It should be understood that the other busses and intermediate circuits can be deployed between the components described above and microprocessor 12 to facilitate interconnection between the components and the microprocessor.

Figure 2:
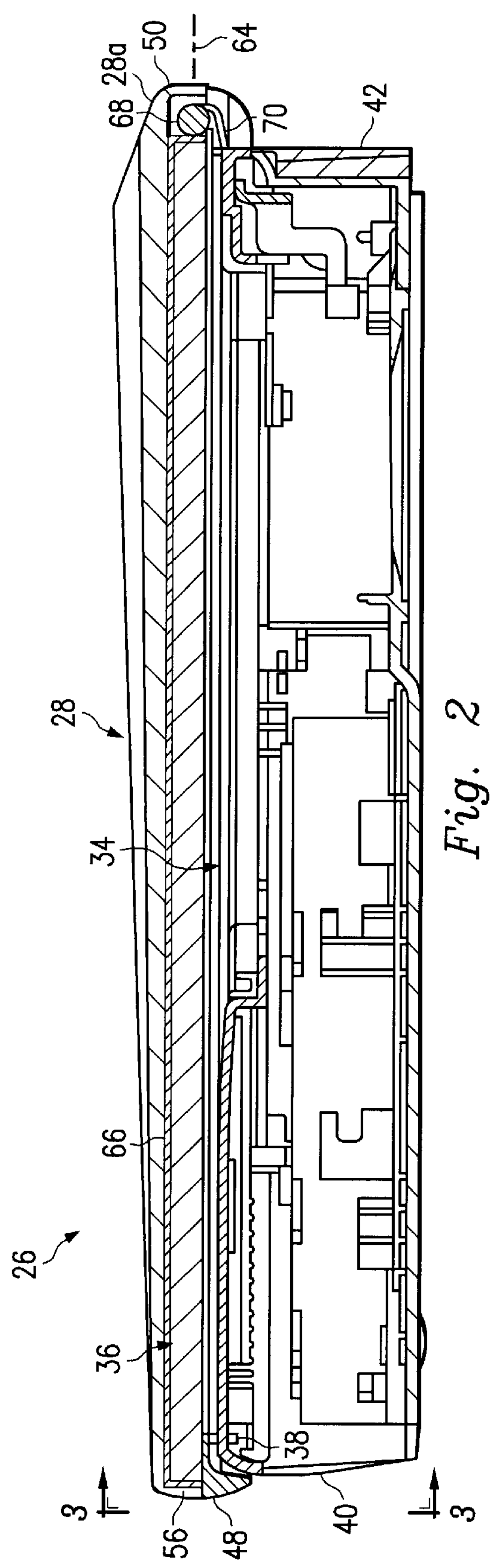
FIG. 2 is a side elevational view illustrating an embodiment of a portable computer.

Referring to FIG. 2, illustrated is a portable, notebook size computer designated 26 comprising a self-contained system such as that illustrated at 10 in FIG. 1, and including a top or cover 28 pivotally connected to a base 32 for opening and closing to expose a keypad 34 mounted on base 32 and an LCD panel 36 mounted in cover 28. Typically, a latch releasable device 38 retains cover 28 engaged with base 32.

Figure 1A:
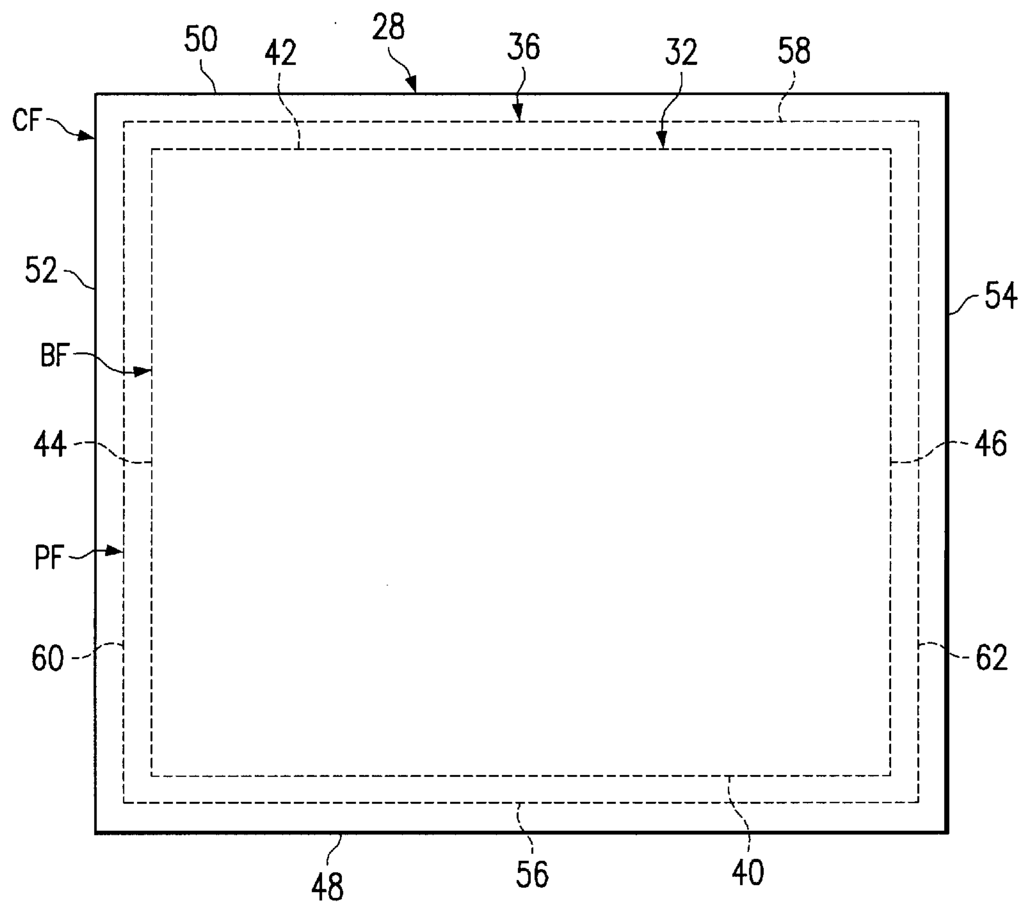
FIG. 1*a* is a diagrammatic view illustrating a footprint diagram of a portable computer.

Base 32, FIG. 1*a* includes four peripheral sides, one of which is a front side 40. Also included is a rear side 42, opposite front side 40, and, as viewed in FIG. 1*a*, a left side 44 and an opposed right side 46. Similarly, cover 28 includes a front side 48, an opposite rear side 50, and, as viewed in FIG. 1*a*, a left side 52 and an opposed right side 54. LCD panel 36 also includes a front side 56, an opposite rear side 58, a left side 60, and a right side 62. Accordingly, base sides 40, 42, 44 and 46, define a base footprint designated BF. Cover sides 48, 50, 52 and 54, define a cover footprint designated CF. LCD panel sides 56, 58, 60 and 62, define a panel footprint designated PF. Therefore, it can be see in FIG. 1*a*, that the sides of the cover footprint CF overhang the sides of the base footprint BF. It can also be seen that the sides of the panel footprint PF overhang the base footprint BF. By overhang, is meant substantially aligned with or extending beyond the peripheral limits of an associated member.

Figure 3:
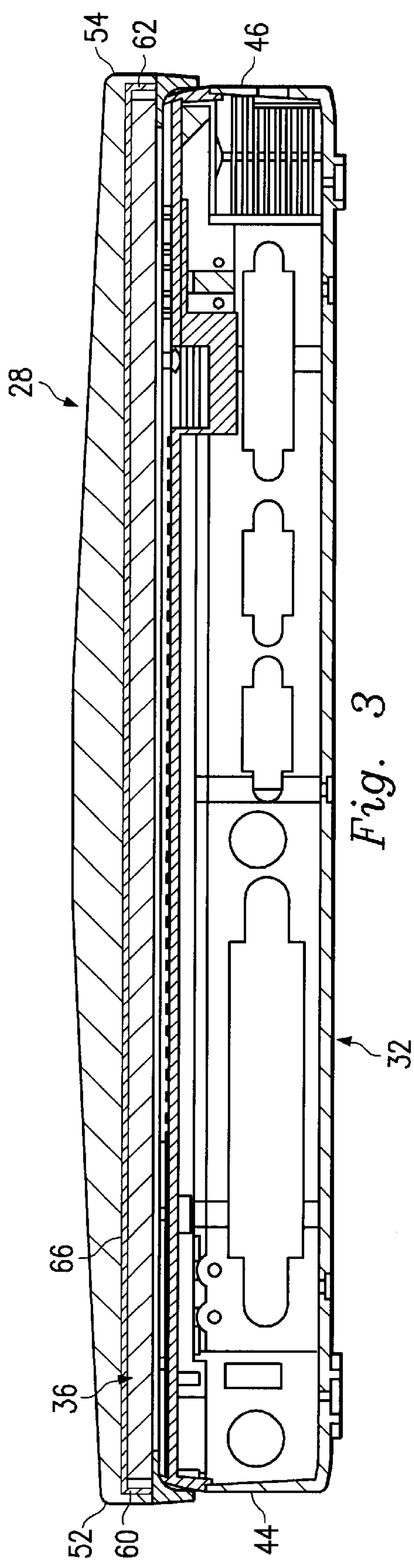
FIG. 3 is a front elevational view taken along the line 3—3 of FIG. 2.

Referring again to FIG. 2, front side 48 and rear side 50, of cover 28 overhang adjacent sides 40 and 42, respectively, of base 32. Also, front side 56 of LCD panel 36, overhangs adjacent side 40 of base 32. Referring to FIG. 3, sides 52 and 54 of cover 28, overhang adjacent sides 44 and 46, respectively, of base 32. Also, sides 60 and 62 of panel 36, overhang adjacent sides 44 and 46, respectively, of base 32.

Figure 4:
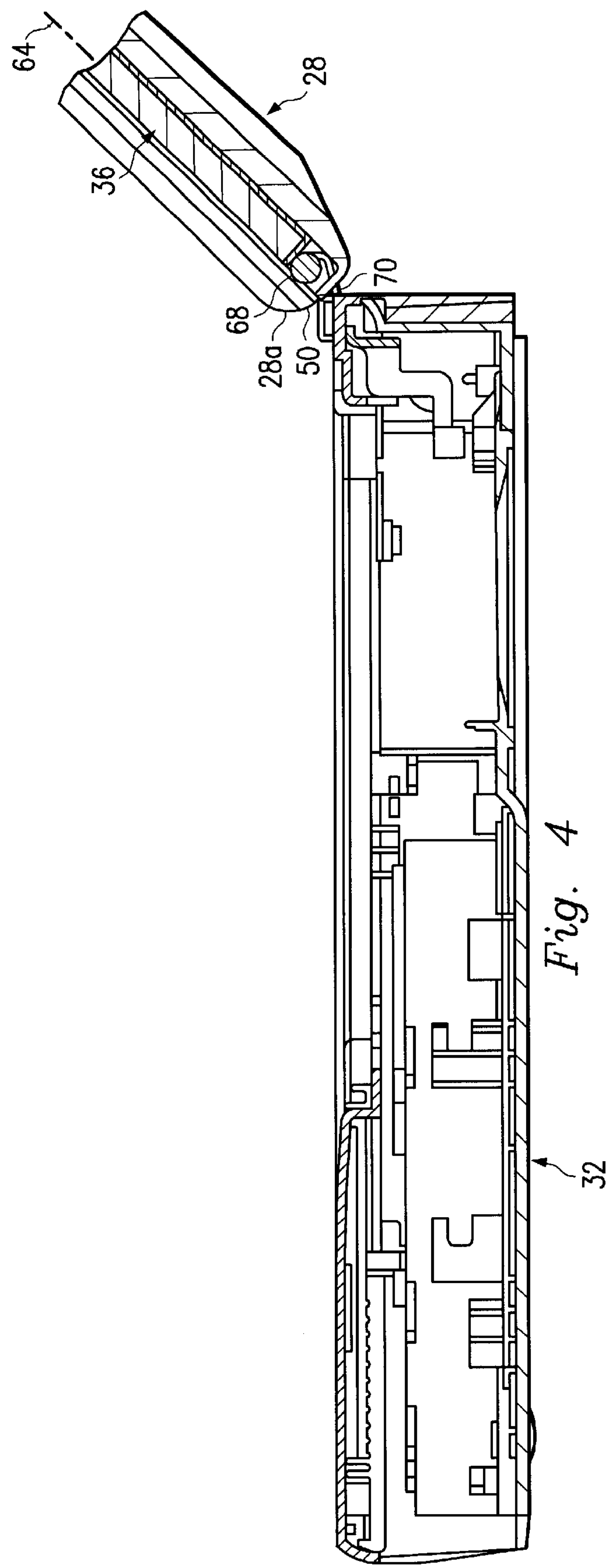
FIG. 4 is an enlarged partial view illustrating an embodiment of a hinge connection of the portable computer.

It is clearly illustrated in FIG. 2, that LCD panel 36 extends along a plane 64 which is substantially parallel to a back plate 66 of cover 28. Referring to FIGS. 2 and 4, a hinge connection 68 is mounted in an extended portion 28*a* of cover 28, adjacent side 50, and substantially along plane 64 of LCD panel 36. A hinge arm 70 extends from base 32 adjacent side 42 such that arm 70 extends at an angle relative to side 42. The extension of arm 70 is sufficient to overhang side 42 of base 32. Arm 70 is pivotally attached to hinge connection 68 in cover 28.

As a result, one embodiment provides a portable computer including a base and a cover for housing an LCD panel. The cover includes peripheral sides overhanging the base. One of the peripheral sides includes an extended portion having a hinge connection. A hinge arm extends from the base and is extended to overhang a peripheral side of the base for pivotal attachment to the hinge connections in the extended portion of the cover.

Another embodiment provides a portable computer including a base having peripheral sides and a cover pivotally connected to the base and including a planar back plate and peripheral sides overhanging the base peripheral sides. An LCD panel is mounted in the cover and extends in a plane substantially parallel to the back plate. A hinge connection is mounted in an extended portion of one of the peripheral sides of the cover and substantially in the plane of the LCD panel. A hinge arm extends from the base to overhang a peripheral side of the base for pivotal attachment to the hinge connection in the extended portion of the cover.

Another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. A portable computer base includes peripheral sides and a cover pivotally connected thereto including a substantially planar back plate and peripheral sides overhanging the base peripheral sides. An LCD panel is mounted in the cover and extends in a plane substantially parallel to the back plate. A hinge connection is mounted in an extended portion of one of the peripheral sides of the cover and substantially in the plane of the LCD panel. A hinge arm extends from the base to overhang a peripheral side of the base for pivotal attachment to the hinge connection in the extended portion of the cover.

Still another embodiment provides a method of accommodating a hinge in a cover for housing an LCD panel. A portable computer base is formed having a hinge arm extending therefrom to overhang a peripheral side of the base. A cover is formed including a substantially planar back plate and peripheral sides extended to overhang the base. An LCD panel is mounted in the cover and extends in a plane substantially parallel to the planar back plate. A hinge connection is mounted in an extended portion of one of the peripheral sides of the cover and substantially in the plane of the LCD panel. The hinge arm is connected to the hinge connection for pivotally attaching the cover to the computer base.

A further embodiment provides a portable computer comprising a base having four sides defining a base footprint, and a cover mounted on the base and having four sides defining a cover footprint. The cover footprint is larger than the base footprint such that the four sides of the cover overhang the four sides of the base. An LCD panel is mounted in the cover and has four sides defining a panel footprint such that the sides of the panel overhang respectively adjacent sides of the base.

As it can be seen, the principal advantages of these embodiments are that in a portable computer, one cover size can be used for an LCD panel cover to host various size LCD panels including an LCD panel having a footprint which is substantially as large as the footprint of the portable computer. The available space previously inhabited within the panel cover by the hinge or clutch is moved to overhang the footprint of the base by extending the footprint of the cover. The hinge connection between the base and cover is substantially along the plane of the LCD panel.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:

a base having peripheral sides;

a cover pivotally connected to the base and including a planar back plate and peripheral sides overhanging the base peripheral sides;

an LCD panel mounted in the cover and extending in a plane substantially parallel to the back plate;

a hinge connection mounted in an extended portion of one of the peripheral sides of the cover and substantially in the plane of the LCD panel;

a hinge arm extending from the base, the hinge arm being extended to overhang a peripheral side of the base for pivotal attachment to the hinge connection in the extended portion of the cover;

wherein the peripheral sides of the base define a base footprint;

wherein the peripheral sides of the cover define a cover footprint overhanging all the peripheral sides of the base; and wherein the LCD panel includes peripheral sides which define a panel footprint such that all the sides of the panel overhang the respectively adjacent sides of the base.

2. A computer system comprising;

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base having peripheral sides;

a cover pivotally connected to the base and including a substantially planar back plate and peripheral sides overhanging the base peripheral sides;

an LCD panel mounted in the cover and extending in a plane substantially parallel to the back plate;

a hinge connection mounted in an extended portion of one of the peripheral sides of the cover and substantially in the plane of the LCD panel;

a hinge arm extending from the base, the hinge arm being extended to overhang a peripheral side of the base for pivotal attachment to the hinge connection in the extended portion of the cover;

wherein the peripheral sides of the base define a base footprint;

wherein the peripheral sides of the cover define a cover footprint larger than the base footprint such that all the cover sides overhang the base sides; and wherein the LCD panel includes peripheral sides which define a panel footprint such that all sides of the panel overhang the respectively adjacent sides of the base.

3. A portable computer comprising:

a base having four sides defining a base footprint;

a cover pivotally mounted on the base and having four sides defining a cover footprint, the cover footprint being larger than the base footprint such that the four sides of the cover overhang the four sides of the base; and an LCD panel mounted in the cover, the LCD panel having four sides defining a panel footprint such that the sides of the panel overhang respectively adjacent sides of the base.

4. The portable computer as defined in claim 3 wherein the cover includes a substantially planar back plate.

5. The portable computer as defined in claim 4 wherein the LCD panel extends in a plane substantially parallel to the back plate.

6. The portable computer as defined in claim 5 further comprising a hinge connection mounted adjacent one of the sides of the cover.

7. The portable computer as defined in claim 6 wherein the hinge connection is substantially in the plane of the LCD panel.

8. The portable computer as defined in claim 7 further comprising a hinge arm extending from the base.

9. The portable computer as defined in claim 8 wherein the hinge arm is extended to overhang one of the sides of the base.

10. The portable computer as defined in claim 9 wherein the hinge arm is pivotally attached to the hinge connection.

* * * * *